United States Patent
Lowe et al.

(10) Patent No.: US 11,170,323 B2
(45) Date of Patent: Nov. 9, 2021

(54) GENERATING AND MANAGING GROUP RESERVATIONS OF TRAVEL RESOURCES

(71) Applicant: MASTERCARD INTERNATIONAL INCORPORATED, Purchase, NY (US)

(72) Inventors: Jennifer Lowe, Briarcliff Manor, NY (US); Benjamin M. Berger, Rye Brook, NY (US); Amarildo Gjondrekaj, Yonkers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 401 days.

(21) Appl. No.: 16/101,338

(22) Filed: Aug. 10, 2018

(65) Prior Publication Data
US 2020/0050976 A1    Feb. 13, 2020

(51) Int. Cl.
*G06Q 10/02* (2012.01)
*G06Q 20/10* (2012.01)
*G06Q 50/14* (2012.01)

(52) U.S. Cl.
CPC ........... *G06Q 10/02* (2013.01); *G06Q 20/102* (2013.01); *G06Q 50/14* (2013.01)

(58) Field of Classification Search
CPC ....... G06Q 10/02; G06Q 20/102; G06Q 50/14
See application file for complete search history.

(56) References Cited

U.S. PATENT DOCUMENTS

| | | | | |
|---|---|---|---|---|
| 2007/0066397 A1* | 3/2007 | Nammi | ................... | G06Q 10/02 463/42 |
| 2007/0271123 A1* | 11/2007 | Miyashita | .............. | G06Q 10/02 705/5 |
| 2013/0290186 A1* | 10/2013 | Esch | ................... | G06Q 30/0613 705/44 |
| 2019/0012612 A1* | 1/2019 | Skeen | ................... | G06Q 20/102 |
| 2019/0066002 A1* | 2/2019 | Bayer | ................ | G06Q 30/0601 |

OTHER PUBLICATIONS

Groves, William & Gini, Maria. On Optimizing Airline Ticket Purchase Timing. 2015. ACM Trans. Intell. Syst. Technol. 7, 1, Article 3 (Oct. 2015). (Year: 2015).*

* cited by examiner

*Primary Examiner* — George Chen
*Assistant Examiner* — Wayne S. Murray

(57) ABSTRACT

The disclosure herein describes generating, managing, and finalizing group reservations of travel resources (e.g., plane tickets, hotel and other lodging reservations, etc.) via a group reservation system. A group reservation request is received including group member data and travel resource reservation data. The reservation data is transmitted to group members based on the group member data. Reservation feedback is then received from the group members. The reservation feedback includes an acceptance message or a rejection message for participation with the travel resource (s). A quantity of acceptance messages received in the reservation feedback is compared to a reservation threshold and, based on the comparison, the group reservation is finalized, wherein the finalized group reservation is associated with group members from whom an acceptance message was received. The described system provides an automated management system for simultaneously organizing and managing reservations for multiple members of a group.

20 Claims, 5 Drawing Sheets

GENERATING AND MANAGING GROUP RESERVATIONS OF TRAVEL RESOURCES

BACKGROUND

Organizing travel plans and event attendance for groups of people presents a variety of logistical challenges. Synchronizing flight plans, travel by train or car, lodging reservations and the like requires frequent communication between group members and, in some cases, members who are unresponsive or otherwise unreliable cause increased stress to organizers and increased complication for the arrangements (e.g., members who miss a window for flight reservation or hotel room reservation may cause organizers to have to plan around late arrival or travel between multiple hotels, etc.). Further, in cases where organizers of a group pay initial costs with the intent to collect from group members later, pursuing money collection adds to the efforts required of the organizers and potentially leaves the organizers footing the bill in the case of non-payment by group members.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for generating and managing group reservations associated with travel resources is described. A group reservation request including member data associated with group members and reservation data associated with at least one reservation relating to at least one travel resource is received by a processor. The reservation data is transmitted, via a network interface, to the group members based on the member data. Reservation feedback is then received, via the network interface, from at least one of the group members. The reservation feedback includes an acceptance message or a rejection message for participation with the at least one travel resource. A quantity of acceptance messages received in the reservation feedback is compared to a reservation threshold and, based on the comparison, the group reservation is finalized, wherein the finalized group reservation is associated with group members from whom an acceptance message was received.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a system and method for generating, managing, and finalizing group reservations of travel resources (e.g., plane tickets, hotel and other lodging reservations, etc.) using a group reservation system. A group reservation request is received that includes information about the group members and travel resources to be reserved. The group reservation system transmits the information about the travel resources to the group members and prompts them to respond with feedback. Reservation feedback is then received from the group members. The reservation feedback includes an acceptance message or a rejection message for participation with the travel resources. In some examples, the feedback includes payment information as well. If a sufficient quantity of the group members responds with acceptance messages, the group reservation is finalized, which may include initializing or otherwise processing payments for the reservation of the travel resources for the group members who accepted the group reservation.

The described group reservation system provides organizers with tools to efficiently manage and automate the arrangement of travel reservations for groups of people. The link of the group reservation system to both the travel aggregator(s) and payment network(s) substantially improves the user experience in comparison to an organizer interacting with each entity separately and tracking costs of reservations, dates of travel, and methods of payment manually. Further, the automated communication with all of the members of a group, which, in some cases, may be quite large, reduces the time and effort required of the organizer in ensuring that all the group members have received the information about the trip and in obtaining responses from unreliable group members as deadlines approach. The processor, memory, and network interface(s) of the group reservation system operate in an unconventional way to enable the streamlined organization of travel resource reservations, communication with and between group members, finalizing group reservations based on group member interest level, and initiating and/or processing payments for reserved travel resources shared by the group members.

Figure 1:
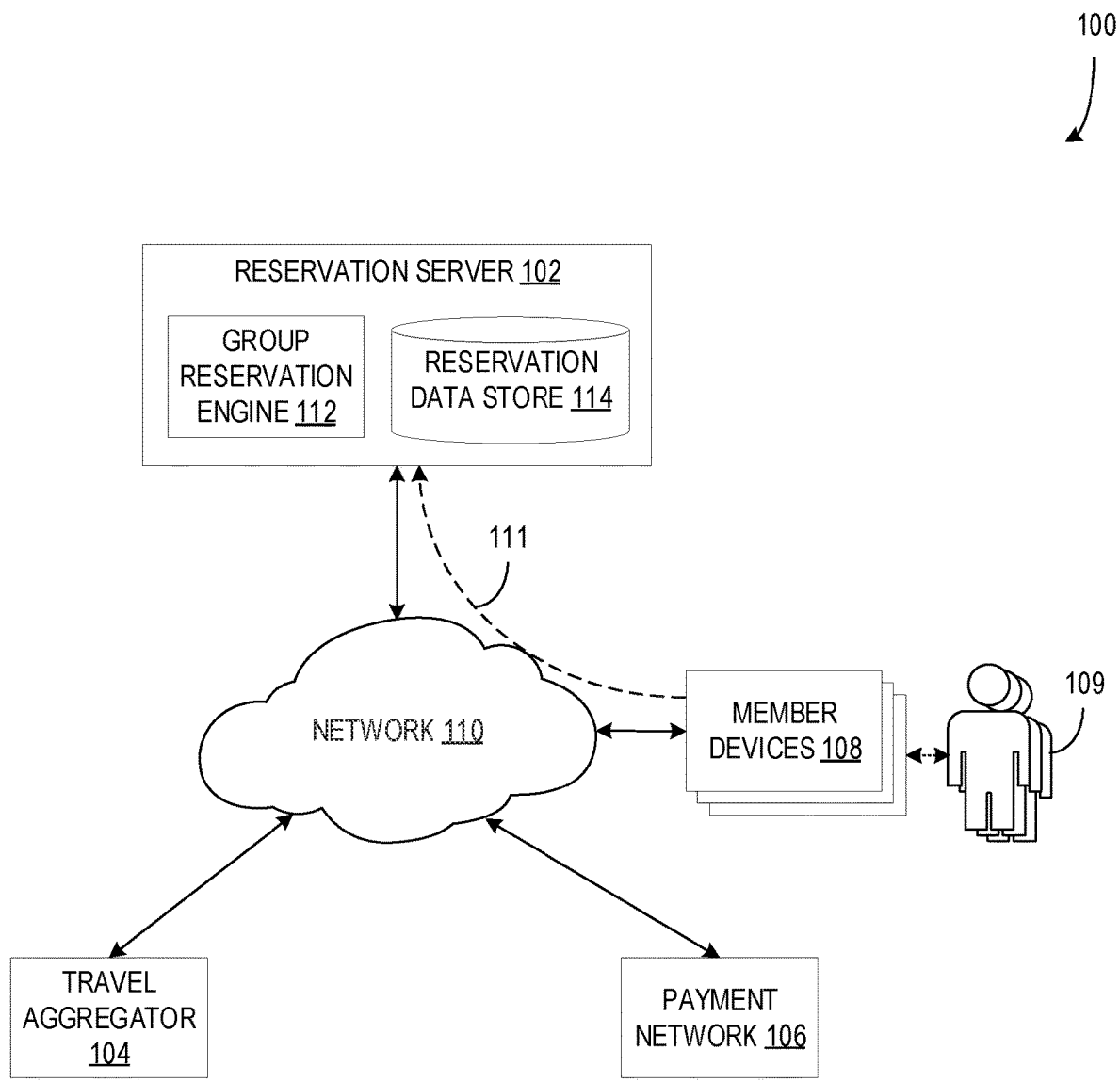
FIG. 1 is an exemplary block diagram illustrating a system configured for managing and finalizing group reservations according to an embodiment.

FIG. 1 is an exemplary block diagram illustrating a system 100 configured for managing and finalizing group reservations according to an embodiment. The system 100 includes a reservation server 102, a travel aggregator 104, a payment network 106, and at least one member device 108 in communication over a network 110. The reservation server 102 includes a group reservation engine 112 and associated reservation data store 114 configured for managing group reservations as described herein.

In some examples, the reservation server 102 includes a computing device that includes at least one processor, memory, interfaces, firmware, and software configured for performing the operations of the group reservation engine 112 as described herein. The reservation data store 114 may include one or more hard drives and/or other data storage devices of the reservation server 102. The group reservation engine 112 includes software for communication with the travel aggregator 104, payment network 106, and member devices 108 over the network 110 and software for managing and processing reservation data that is stored in and accessed from the reservation data store 114. The group reservation engine 112 is described in greater detail below.

The travel aggregator 104 include at least one computing device and associated hardware, firmware, and/or software configured for providing access to travel resources available for reservation and enabling the reservation of accessed travel resources. In some examples, travel resources include transportation on planes, trains, ships, and/or rental cars, stays in hotels or at resorts, reservations at restaurants, or other tourism-based events such as tickets to sporting events or cultural events (e.g., theater performances, symphony performances, art shows, etc.). The travel aggregator 104 may be configured to collect information about available travel resources from one or more sources, such as airline companies, hotel and/or resort companies, rental car companies, or the like. The travel aggregator 104 is further configured to communicate over the network 110. The communication may be in the form a website or web-based application that may be accessed by other devices via the network 110. Alternatively, or additionally, the travel aggregator 104 may be configured to expose application program interfaces (APIs) for communication with other applications (e.g., the group reservation engine 112, applications on member devices 108, applications associated with payment network 106, etc.). Such APIs may be configured to enable searching of available resources based on provided preference data or filter data (e.g., a date range for reservation, a number of stops during a plane trip, a star rating preference for hotels, etc.). Further, the travel aggregator 104 APIs may be configured to facilitate the creation, management, editing, and/or cancellation of reservations of resources with the source companies or entities of the resources (e.g., the travel aggregator 104 enables a user to create a reservation for a seat on a flight of an airline company, etc.).

In some examples, the group reservation engine 112 is configured to communicate with at least one travel aggregator 104 via APIs exposed by the travel aggregator 104. Alternative embodiments of the system 100 may include multiple travel aggregators and each travel aggregator may provide access to similar sets of travel resources or the travel aggregators may provide access to genre-specific travel resources (e.g., one travel aggregator may be specific to hotel stays while another travel aggregator may be specific to sporting events in a provided destination city, etc.). Further, the group reservation engine 112 may be configured to communicated directly with the sources of the travel resources (e.g., directly with an airline company, directly with a vacation resort, etc.).

The payment network 106 (e.g., MASTERCARD, etc.) is a company or similar entity that facilitates transactions associated with accounts of users, companies, or the like. Through the facilitation of transactions, the payment network 106 records transaction data to a transaction data store. In some examples, the payment network 106 also provides transaction data to the reservation server 102 for use by the group reservation engine 112 as described herein. Transaction data stored by the payment network 106 may include, for instance, account identifiers for parties of the transactions, date/time data, location data of the transactions, transaction category data, etc. The group reservation engine 112 may be configured to interact with the payment network 106 to enable group members to provide payment for reserved resources via credit accounts, bank accounts, or other payment methods that are facilitated by the payment network 106.

The member devices 108 are computing devices owned and/or used by users such as group members 109 associated with group reservations as described herein. The member devices 108 may include, for instance, personal computers, laptop computers, server devices, tablets, tablet-phone hybrids (phablets), mobile phones and other mobile computing device, wearable computing devices, etc. The member devices 108 are configured for communication over the network 110 and may be configured to communicate with the group reservation engine 112, the travel aggregator 104, and/or the payment network 106 as described herein. In some examples, the member devices 108 include software programs or applications that are configured to provide user interfaces for interaction with the other entities of the system 100. For instance, member devices 108 may include a web browser application enabling a user to view a website associated with the group reservation engine 112. Alternatively, or additionally, the member devices 108 may include applications configured to enable communication via electronic mail (e-mail) or other known forms of network communication. Further, the member devices 108 may include applications configured specifically for use with the group reservation engine 112, such that, in some examples, some or all of the operations performed by the group reservation engine 112 as described herein may occur on one or more of the member devices 108 instead of or in combination with the operations performed on the reservation server 102.

In some examples, the member devices 108 are configured to enable a user to initiate a group reservation by sending a group reservation request 111, illustrated as a dotted line between the member devices 108 and the reservation server 102, to the group reservation engine 112. The group reservation request 111 may include information about the resources to be reserved, the date/time for which the resources are to be reserved, and the identification and/or contact information of group members 109 to be included in the group reservation. The member devices 108 may provide user interfaces (e.g., graphical user interfaces (GUIs), command line interfaces (CLIs), audio-based or voice-driven interfaces, etc.) enabling the organizing group member to input the group reservation request information. Further, the member devices 108 may be configured to receive notifications from the group reservation engine 112 and display or otherwise provide received notifications to the users of the member devices 108 (e.g., notifications of finalization of a group reservation, notifications of cancellation of a group reservation, prompts to provide reservation feedback for a pending group reservation, etc.).

Additionally, the member devices 108 may be configured to collect payment information from an organizing member and/or other group members 109 associated with a group reservation, provide status information associated with pending group reservations, provide additional recommendations of reservations based on currently pending group reservations and/or the group members' reservation or transaction history, provide information about earning reward program points based on pending group reservations, etc. In some examples, the applications of the member devices 108 associated with the group reservation engine 112 may further be associated with the payment network 106.

It should be understood that network 110 may include one or more integrated or otherwise connected networks. The network 110 may include public and/or private networks, large-scale networks, such as the Internet, and/or relatively smaller intranets. The network 110 may be accessed via wired and/or wireless connections, using any and all network protocols as understood by a person of ordinary skill in the art.

Figure 2:
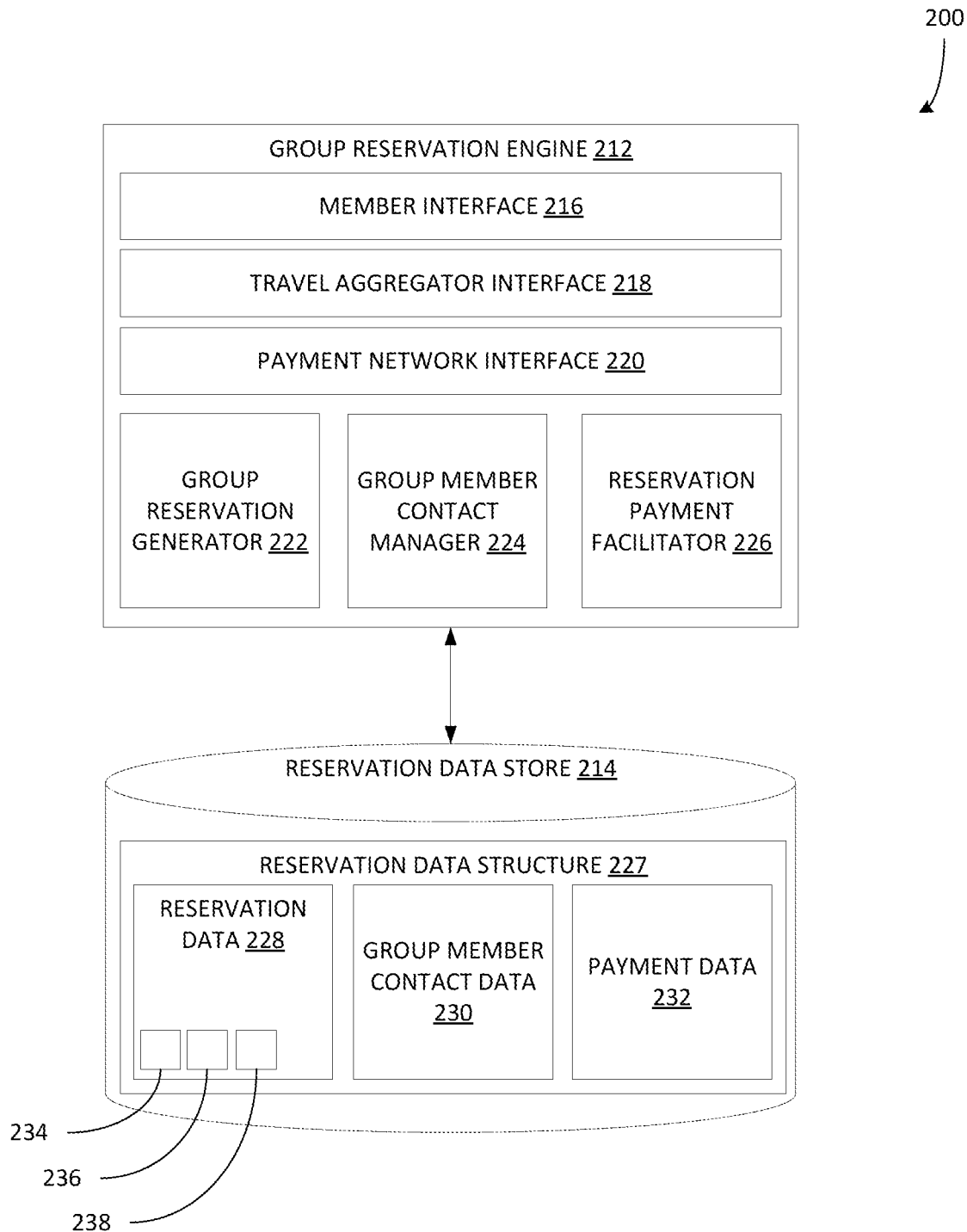
FIG. 2 is an exemplary block diagram illustrating a group reservation engine and an associated reservation data store according to an embodiment.

FIG. 2 is an exemplary block diagram 200 illustrating a group reservation engine 212 and an associated reservation data store 214 according to an embodiment. The group reservation engine 212 includes a member interface 216, travel aggregator interface 218 and payment network interface 220. Further, the group reservation engine 212 includes a group reservation generator 222, a group member contact manager 224, and a reservation payment facilitator 226. The reservation data store 214 includes reservation data 228, group member contact data 230, and payment data 232. Additionally, the reservation data 228 includes travel resource data 234, a reservation threshold 236, and a reservation time period 238. In some examples, the group reservation engine 212 includes computer hardware, firmware, and/or software configured to perform the functions and/or processes described herein.

The interfaces 216, 218, and 220 may include hardware, firmware and/or software configured for communicating with users (e.g., group members 109, etc.), travel aggregators (e.g., travel aggregator 104, etc.), and payment networks (e.g., payment network 106, etc.) respectively. The interfaces may enable communication over one or more networks (e.g., network 110, etc.). It should be understood that the interfaces 216, 218, and 220 may be configured for communication between the group reservation engine 212 and other entities of the system (e.g., system 100, etc.) in any configuration that provides the described functionality without departing from the description herein.

In some examples, the member interface 216 is configured to communicate with computing devices of users (e.g., member devices 108, etc.) to provide data associated with group reservations for communication to the users of the devices. The provided data may include data that is displayed in a graphical user interface (GUI) or other type of user interface (e.g., a text-based interface, an audio interface, etc.). Further the member interface 216 may be configured to collect data associated with group reservations from users via the same or similar user interfaces (e.g., GUIs, etc.). For instance, a user may access a web site associated with the group reservation engine 212 on the user's computing device. The user may provide data for the generation of a group reservation, such as names or other identifiers of the group members, travel resources to reserve, a defined reservation time period, etc. by entering the data into fields of the accessed website. The user may select a button or link of the website to send the provided data to the group reservation engine 212 over a network connection, and the group reservation engine 212 receives the sent reservation data. In another example, a user requests access to a generated group reservation via an application associated with the group reservation engine 212 installed on the user's computing device. The group reservation engine 212 receives the request and responds by providing requested data (e.g., reservation data 228, group member contact data 230, payment data 232, etc.) associated with generated group reservation data to the application. The application then displays the provided data to the user.

The travel aggregator interface 218 is configured to communicate with one or more computing devices associated with travel aggregators (e.g., travel aggregator 104, etc.) to access and/or provide data associated with new or already-generated group reservations. Provided data may include search requests for travel resources to potentially reserve, instructions to reserve travel resources, status requests associated with reserved travel resources, payment information of group members for us in finalizing group reservations with the travel aggregator and associated companies, etc. The travel aggregator(s) may further transmit or otherwise provide data associated with group reservations to the group reservation engine 212 via the travel aggregator interface 218.

The payment network interface 220 is configured to communicate with one or more computing devices associated with one or more payment networks (e.g., payment network 106, etc.) to facilitate payments associated with group reservations as described herein. Data communicated via the payment network interface 220 may include payment information associated with group members, travel resources and associated companies, travel aggregators, etc. Further, the payment network interface 220 may be used to request and/or receive transaction data and/or transaction history data associated with group members, reserved travel resources and associated companies, etc. for use by the group reservation engine 212 in generating, managing, and finalizing group reservations as described herein.

The group reservation generator 222 includes hardware, firmware, and/or software configured to generate a group reservation based on reservation data 228. In some examples, the group reservation generator 222 includes at least one processor, memory, and processor-executable instructions that, when executed, cause the at least one processor to perform the operations described herein. In some examples, the group reservation generator 222 is configured to receive a group reservation request (e.g., group reservation request 111, etc.) via the member interface 216 from a user (e.g., group members 109, etc.). The group reservation request may include some or all of reservation data 228, including an identifier of at least one travel resource to reserve and an identifier of at least one group member. The group reservation request may further include a reservation time period defined by the user (e.g., an amount of time that other group members have to respond with reservation feedback, etc.) and group member contact information (e.g., electronic mail (e-mail) address, user name or other similar identifier, phone number, address, etc.) providing the group reservation engine 212 with a method of contacting the group members to prompt them to provide reservation feedback.

The group reservation generator 222 is further configured to generate a group reservation in the form of a reservation data structure 227 that may be stored on the reservation data store 214 and include the reservation data 228, the group member contact data 230, and any received payment data 232. In addition to the reservation data provided by the user in the group reservation request, the reservation data 228 may include data received from a travel aggregator or associated company via the travel aggregator interface 218 (e.g., costs to reserve travel resources, dates and times of travel resource availability, information about alternative travel resources or travel resources related to reserved travel resources, etc.). Further, the reservation data 228 may include data received from a payment network via the payment network interface 220 (e.g., transaction history data associated with reserved travel resources, transaction data associated with group members, etc.). The generated group reservation and associated reservation data structure 227 may be used by the group reservation generator 222 and the group reservation engine 212 generally throughout the operations and/or processes described herein. For instance, a user may provide a group reservation request including reservation data and group member data which is used by the group reservation generator 222 to generate a group reservation. Later, details associated with the reservation of travel resources identified by the user may be received via the travel aggregator interface 218 and added to the group reservation.

The reservation data 228 may include travel resource data 234 associated with one or more travel resource that has been or will be reserved in association with the generated reservation data structure 227. The travel resource data 234 may include, for instance, identifiers of the travel resources, identifiers and/or contact information of companies or other entities that own and/or manage the travel resources, date and/or time data during which the travel resources are or will be reserved, price data associated with the reservation of the travel resources, and/or category information, such as a type of a travel resource (e.g., restaurants, plane flights, museum tickets, etc.), an age range associated with the travel resource (e.g., a travel resource may be appropriate for all ages, limited to an adult age range, etc.), a region or geographic area associated with the travel resource (e.g., a region of a country, a neighborhood, etc.), etc.

In some examples, the travel resource data 234 may further include historical transaction data associated with a travel resource that is provided to the group members and/or used by the group reservation engine 212 to predict future availability of the travel resource (e.g., predicting when a theater show will sell out based on when the show sold out on previous runs, etc.) and/or future rising or falling costs (e.g., predicting when a flight will be the cheapest based on previous ticket purchase cost data, etc.). The historical transaction data may be obtained from a travel aggregator via the travel aggregator interface 218 and/or from a payment network via the payment network interface 220. Alternatively, or additionally, the group reservation engine 212 may analyze the historical transaction data to provide recommendations of other travel resources based on travel resource reservations selected by the organizing group member or members (e.g., based on a room reservation at a particular hotel, the group reservation engine may recommend making reservations at a nearby restaurant and/or a restaurant which other people who previously stayed at the hotel frequented, etc.).

In some examples, the reservation data 228 includes a reservation threshold 236 and reservation time period 238 that are default values associated with the group reservation engine 212. For instance, a default reservation threshold 236 may be set at a value that is 50% of the total number of group members, rounded up or down, depending on the configuration of the group reservation engine 212, included in the group reservation (e.g., 3 members of a group of 6 members, 4 members of a group of 7 members, etc.). In another example, a default reservation time period 238 may be set to 10 days from the initial notification of the group reservation, or to a date that is 2 weeks before the occurrence of the travel resource reservation (e.g., 2 weeks prior to the first day of the reserved resort stay, etc.). The default reservation time period 238 may also be determined by the group reservation engine 212 based on the historical transaction data of the travel resource data 234 as described above (e.g., the default reservation time period 238 may be set to expire at a time when the price of reserving the travel resource is predicted to be low, or it may be set to expire prior to a predicted unavailability of the travel resource, such as tickets to an event selling out, etc.). Alternatively, or additionally, the reservation threshold 236 and reservation time period 238 may be defined by a group member during the generation of the group reservation and/or the values may be created or edited at a later point during the group reservation process (e.g., the organizing group member may extend the reservation time period 238 when it becomes apparent that the other group members cannot commit to the reservation for two weeks, etc.).

The group member contact manager 224 includes hardware, firmware, and/or software configured to manage contact information of and communication with group members of a generated group reservation based on group member contact data 230. In some examples, the group member contact manager 224 includes at least one processor, memory, and processor-executable instructions that, when executed, cause the at least one processor to perform the operations described herein. The group member contact manager 224 may be configured to initiate communication with the group members via the member interface based on the group member contact data 230. For instance, upon the generation of the reservation data structure 227, group member contact data 230 that was provided in a group reservation request is recorded therein and the group member contact manager 224 transmits or otherwise sends an initial notification of the group reservation to some or all of the group members represented in the group member contact data 230. Further contact may also be initiated, such as period reminder messages to group members that have not yet provided feedback, travel resource recommendation messages to organizing group member(s) based on the reserved travel resources, etc.

The group member contact manager 224 may also be configured to receive communications from group members via the member interface 216. Received communications may include reservation feedback messages from group members, interactions from organizing group members to create new reservations, change current reservations, or cancel and/or delete reservations of travel resources associated with the group reservation and reservation data structure 227, etc. In some examples, the group member contact manager 224 may collect payment data from one or more of the group members the received communications and store it as payment data 232 in the reservation data structure 227.

The group member contact data 230 may include the means for contacting the group members (e.g., electronic mail (e-mail) address, user name or other similar identifier, phone number, address, etc.). In some examples, the group member contact data 230 may be based on member profiles that are associated with the group reservation engine 212 and any other associated applications provided for use by group members. For instance, the group reservation engine 212 and an associated web service may enable group members to sign in to the system and create a member profile. Member profiles may be configured to define a preferred method of contact provided by the associated group member. Once the member profile is created, the member's username or other identifier may be stored in the group member contact data 230 of the reservation data structure 227 and, when contacting the group member, the group member contact manager 224 may access the member profile of the group member to obtain the preferred method of contact information and use the obtained method of contact information to contact the group member.

Alternatively, or additionally, members that do not have a member profile, or in embodiments where the group reservation engine 212 does not provide member profile functionality, the group member contact data 230 may include the group members' e-mail addresses and send e-mails to those addresses to initiate contact with the group members.

Group member contact data 230 may also include records of communication between the group reservation engine 212 and the group members. The reservation feedback messages received from the group members, including acceptance messages and/or rejection messages, may be stored in the group member contact data 230, including time and date data that the messages are received. In some examples, the group member contact manager 224 is configured to store records of all communications with the group members in the group member contact data 230. The stored records may further be used by the group member contact manager 224 to identify group members that have not responded to the group reservation notifications. The group member contact manager 224 may be configured to send reminder notifications to group members that have not responded at a defined time interval (e.g., every two weeks, once a week when the reservation expires in less than a month, etc.). The time interval for reminders to group members may be a default value of the group member contact manager 224 or it may be defined by an organizing group member.

The reservation payment facilitator 226 includes hardware, firmware, and/or software configured to facilitate and complete payments for reserved travel resources of an associated group reservation based on the reservation data 228 and the payment data 232. In some examples, the reservation payment facilitator 226 includes at least one processor, memory, and processor-executable instructions that, when executed, cause the at least one processor to perform the operations described herein. The reservation payment facilitator 226 may be configured to communicate with a travel aggregator via the travel aggregator interface 218 and/or a payment network via the payment network interface 220 to initiate payment from one or more accounts (e.g., bank accounts, credit card accounts, other payment accounts, etc.) of the group members to companies or other entities that own, operate, or otherwise manage the travel resources associated with the group reservation. It should be understood that the payment transactions facilitated by the reservation payment facilitator 226 may occur in any conventional manner as would be understood by a person of ordinary skill in the art without departing from the description herein.

The payment data 232 may include payment account information from one or more group members of the group reservation. The payment data 232 may be provided by an organizing group member in the initial group reservation request and/or by group members in communications with the group member contact manager 224 as described above. In some examples, when a group member responds with an acceptance message to the group reservation, the group member is prompted to provide payment data, including the group member's payment account information. Additionally, the payment data 232 may include cost splitting or sharing information indicating what fraction of the cost each group member will pay. For instance, a group reservation that includes a stay at a resort for four people may be split evenly four ways between each of the group members. Alternatively, some group members may pay less and/or more depending on the configuration of the group reservation. For instance, in a group reservation that includes multiple travel resource reservations, each group member may not attend or otherwise make use of all of the travel resources (e.g., if a group of four people go out to dinner but only three of them attend a concert after dinner, etc.). In that case, the costs may be split evenly for each travel resource based on what the group members indicated in the associated acceptance messages. The reservation payment facilitator 226 may automatically split payments between group members in such a way that each group member pays an even share for each travel resource used and/or each event in which they participated. However, the cost sharing and/or splitting may be adjusted by group members based on their preferences (e.g., all costs for a couple may be adjusted to only apply to one group member of the couple, etc.).

In some examples, the reservation payment facilitator 226 and group member contact manager 224 may be configured to act in conjunction to send payment notification messages, including total cost to be charged to each group member, a breakdown of what costs are included in the total cost, an account to which the cost will be charged, etc., to the group members prior to initiating the payments to finalize the group reservation. The group members may respond to the payment notification messages to confirm that the payment notification information is correct or they may respond to provide corrections to any of the payment information prior to initiation of the payments. Once all of the payments are confirmed to be correct for the group members, the reservation payment facilitator 226 may be configured to initiate the payments through communication with a payment network via the payment network interface 220.

It should be understood that, while the exemplary systems and methods described herein primarily deal with "travel resources", in alternative examples, the group reservation systems and/or methods may be used with resources that are not associated with travel by the group members, such as local sporting events or activities (e.g., reservations for a paint ball event, reservations for an escape room event, etc.).

In some examples, the group reservation engine 212 is configured to adjust parameters of various operations based on past performance so the operations. For instance, the frequency and timing of reminder messages to group members may be adjusted based on the results of previous reminder messages associated with specific groups, group members, travel resources, travel destinations, or the like. When a reminder message is scheduled for 48 hours before the expiration of the reservation time period and a significant number of group members fail to respond within the allotted time, the group reservation engine 212, via the group member contact manager 224, may adjust the timing of future reminder messages to occur sooner and/or more frequently with respect to the particular group, group members, and/or travel resources being reserved. Other parameters (e.g., the content of messages to group members, reservation recommendation parameters, etc.) may also be adjusted by the group reservation engine 212 or a responsible user thereof in response to results of past operations without departing from the description herein.

Figure 3:
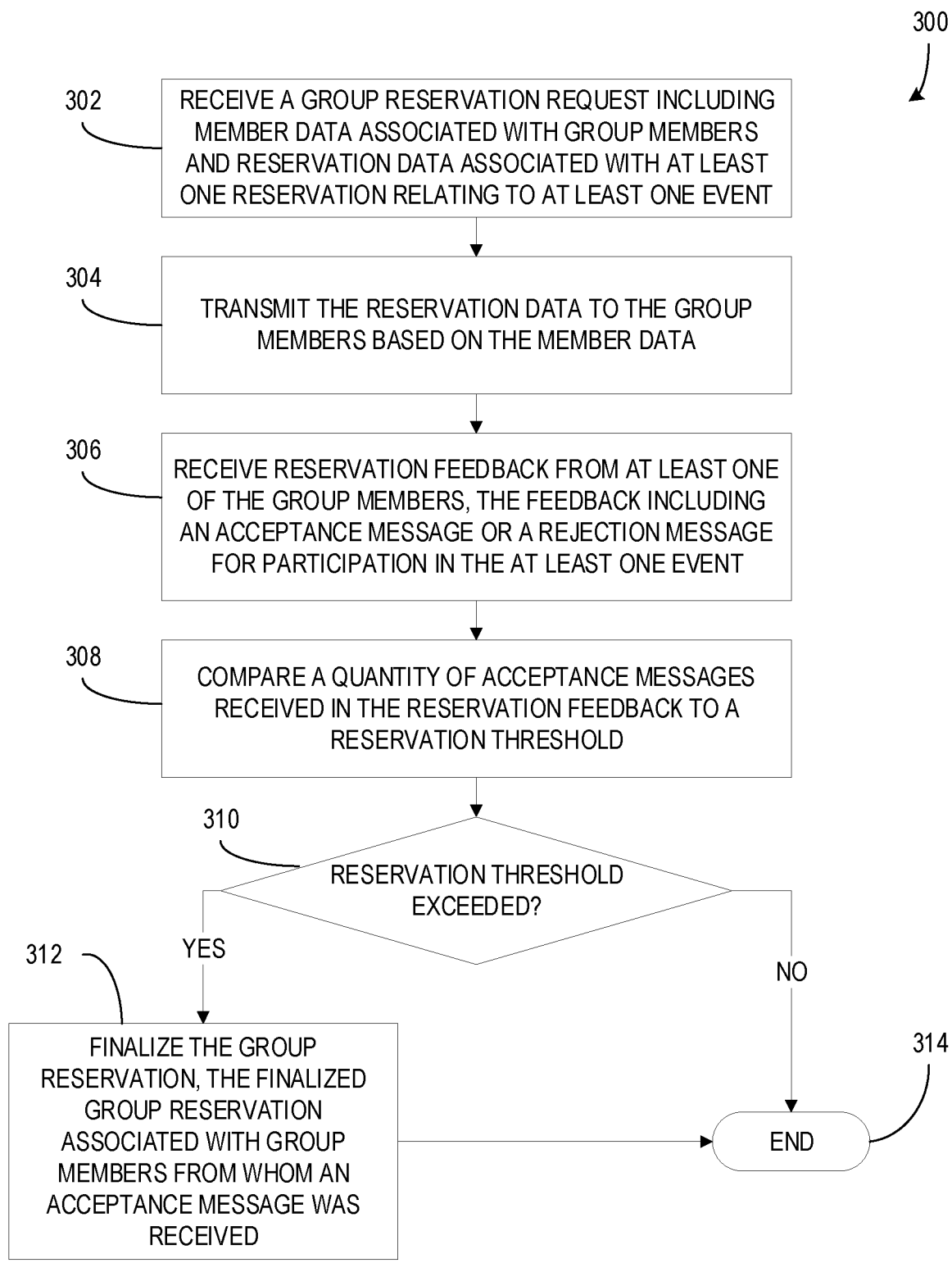
FIG. 3 is an exemplary flow chart illustrating managing and finalizing a group reservation based on a received group reservation request according to an embodiment.

FIG. 3 is an exemplary flow chart 300 illustrating managing and finalizing a group reservation based on a received group reservation request according to an embodiment. In some examples, the system 100 of FIG. 1 and/or the group reservation engine 212 of FIG. 2 are configured to implement the process described by flow chart 300. At 302, a group reservation request including member data associated with group members and reservation data associated with at least one reservation relating to at least one event is received. In some examples, the group reservation request is received by a group reservation engine from a computing device (e.g., a member device 108, etc.) of an organizing group member via a network and/or a user interface (e.g., member interface 216, etc.). The group reservation request may be received by the group reservation engine in a single message or it may be received in multiple messages. For instance, the group reservation engine may prompt the organizing group member to provide the information of the group reservation request through a series of messages (e.g., prompting the group member to identify travel resources to reserve, then prompting the group member to provide contact information of the other group members, then prompting the group member to provide payment information, such as a payment account number, for use in temporarily holding the reservation, etc.). As described above, the group reservation request may include reservation data (e.g., reservation data 228, etc.), group member contact data (e.g., group member contact data 230, etc.), and payment data (e.g., payment data 232, etc.). Further, the organizing group member may provide one or more preferences in the group reservation request, such as preferences regarding the length of the reservation time period, the frequency and method through which the group members are contacted, the way that costs of the associated reservations will be split between group members, etc.

At 304, the reservation data is transmitted to the group members based on the member data. In some examples, the reservation data is transmitted to the group members based on group member contact data (e.g., group member contact data 230, etc.) as described above. For instance, the reservation data may be sent to each group member using the group members e-mail address or, alternatively or additionally, using a contact method defined by the group member in the group member's member profile. Some or all of the total reservation data may be transmitted to the users. For example, while the reservation data of the associated reservation data structure (e.g., reservation data structure 227, etc.) may contain extensive details regarding the reservation of multiple travel resources as described herein, each group member may receive a subset of the reservation data that summarizes the associated reservations (e.g., dates of the reservations, costs to reserve the travel resources, some description of the travel resources, etc.). In addition to such a reservation data summary, the group members may be provided with instructions to access the details of the reservation data from the group reservation engine (e.g., the group members may be instructed to log in to the system using a member profile to view arrangement details included by the organizing group member, etc.).

The reservation data may be transmitted to the group members in a single notification message or in multiple messages. In some examples, the reservation data may be provided in an interactive user interface that enables the group member to review the reservation data and immediately provide a feedback response as described herein (e.g., the reservation data may be provided in an electronic form web page or the like, such that the group member may fill out fields of the electronic form to accept the reservation invitation, reject the reservation invitation, or, if multiple reservations are present, respond to each reservation separately, etc.).

In some examples, the reservation data may be transmitted to group members at multiple instances throughout the defined reservation time period. After the first transmission, later messages may be in the form of reminder messages to remind the group members to respond. After a group member has responded to the invitation to participate in the event associated with the reservation data, reminder messages may no longer be transmitted to that group member.

At 306, reservation feedback is received from at least one of the group members. The feedback includes an acceptance message or a rejection message for participation in the at least one event. The reservation feedback may include one or more messages received over a network and/or a user interface as described herein. The reservation feedback may be received in direct response to the transmission of the reservation data (e.g., a feedback response to a prompt of a web application associated with the group reservation engine, etc.) and/or the reservation feedback may be received at a later point (e.g., an e-mail response to a transmitted reservation data e-mail that was sent a week ago, etc.). The feedback may include an acceptance message confirming that the group member would like to attend and/or participate in the associated event or it may include a rejection message indicating that the group member will not attend and/or participate in the associated event. In some examples, the feedback may include acceptance of a subset of the travel resources to be reserved and rejection of any other travel resource to be reserved (e.g., acceptance of a stay at a resort, indicating that the group member will participate in the resort trip, but rejection of a musical concert reservation of a musical concert occurring on one of the evenings of the associated trip, etc.).

Further, the feedback may include payment information of the group member if the group member indicates that they accept one or more of the travel resources to be reserved, as described above. If the reservation of the travel resources requires any additional information from the group member (e.g., to reserve a flight, the group member's full name, birth date, or other identifying information may be required, etc.), that information may also be included in an acceptance message from the group member or another message associated therewith.

In some examples, a rejection message may include other information, such as a reason that the group member rejected the invitation to the group reservation. The rejection group member may also provide suggested alternative reservations, alternative dates or times, or the like.

At 308, a quantity of acceptance messages received in the reservation feedback are compared to a reservation threshold. If the reservation threshold is exceeded by the quantity of acceptance messages at 310, the group reservation is finalized at 312. The finalized group reservation is associated with group members from whom an acceptance message was received. As described above, the reservation threshold may be a default value assigned by the group reservation engine or it may be a value defined by an organizing group member in the group reservation request or in a later communication with the group reservation engine. Other parameters may also be required to exceed the reservation threshold, as defined by an organizing group member. For instance, if the group reservation is associated with a group member's birthday, then the reservation threshold is not exceeded unless the group member whose birthday is being celebrated agrees to attend, regardless of how many other group members agree to attend. Other such parameter thresholds may be defined by an organizing group member to ensure that a sufficient number of group members and/or required group members agree to attend before finalizing the reservation.

In some examples, finalizing the reservation includes initiating or otherwise processing payment for the travel resource(s) to be reserved. The payment may be made based on the provided payment data (e.g., payment data 232, etc.) of the group members. The payment for the reservation may be split between accounts of the group members or it may be payed entirely by a single group member as described herein. Additionally, or alternatively, an organizing group member may initially provide payment information upon requesting the group reservation, such that the organizing group member may be charged a deposit or fee, or a hold may be placed on the organizing group member's account, to reserve the travel resources associated with the group reservation. When the group reservation is being finalized, any deposit paid may be refunded or any hold placed on an account may be released when the payment for the reservation is successful.

Alternatively, if the reservation threshold is not exceeded at 310, the process may end at 314. In the event that the reservation threshold is not exceeded, other operations or processes may also occur as described below with respect to FIG. 4.

Figure 4:
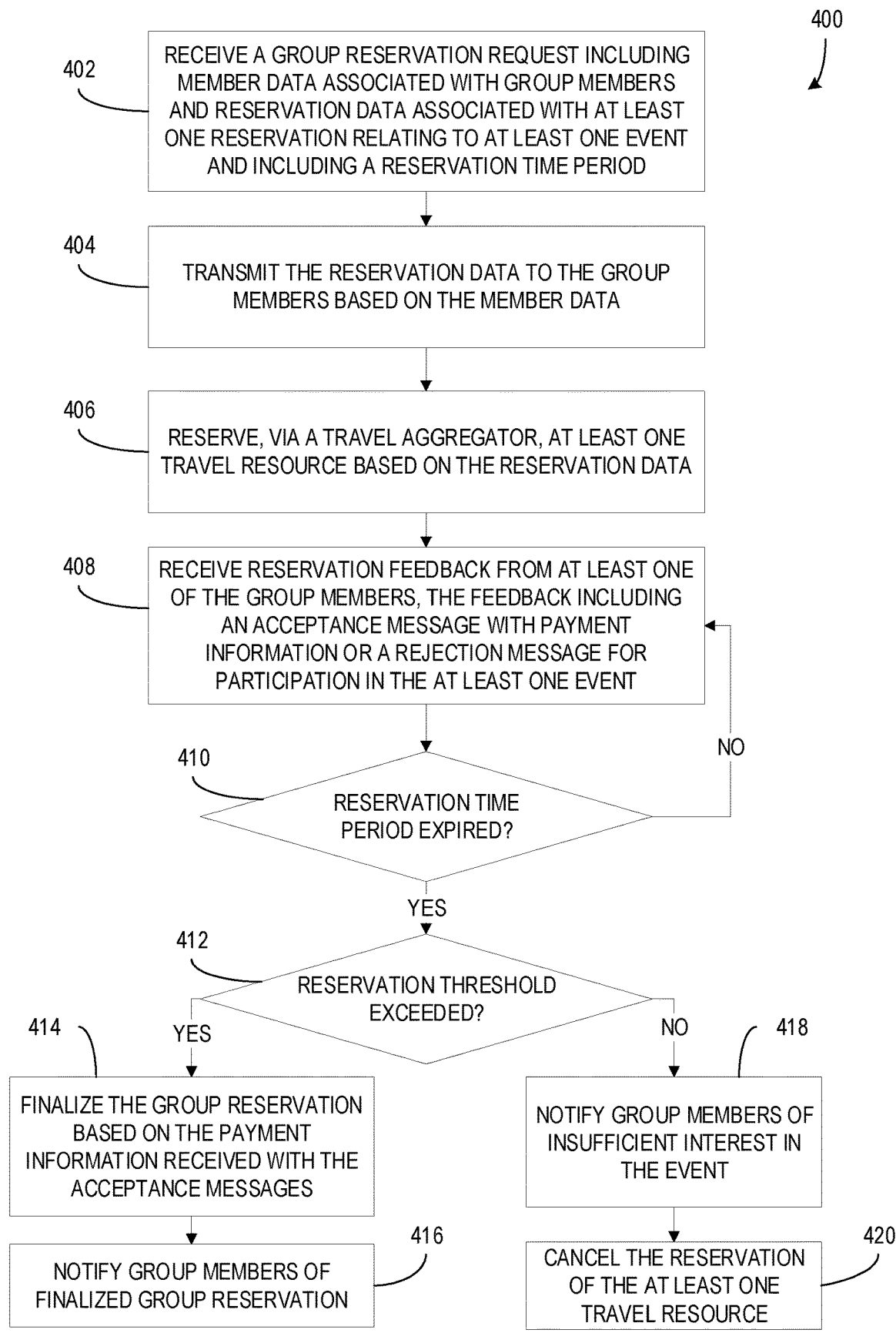
FIG. 4 is an exemplary flow chart illustrating managing a group reservation based on a received group reservation request over a defined reservation time period and notifying group members of the result of the reservation according to an embodiment.

FIG. 4 is an exemplary flow chart 400 illustrating managing a group reservation based on a received group reservation request over a defined reservation time period and notifying group members of the result of the reservation according to an embodiment. In some examples, the system 100 of FIG. 1 and/or the group reservation engine 212 of FIG. 2 are configured to implement the process described by flow chart 400. At 402-404, a group reservation request is received, and the reservation data is transmitted as described above with respect to 302-304 of FIG. 3. The reservation data further includes a reservation time period indicating a length of time during which the group members may provide reservation feedback.

At 406, at least one travel resource based on the reservation data is reserved via a travel aggregator. In some examples, the reservation of the at least one travel resource is temporary and may require an organizing group member to pay a temporary deposit or fee, or have a temporary hold placed on a payment account as described above. Alternatively, an organizing group member may pay a total amount for reservation of the travel resource, wherein some or all of the payment amount is refundable in the event that the group reservation is unsuccessful. Other methods of reserving travel resources and may be used without departing from the description herein.

At 408, reservation feedback is received from at least one of the group members, the feedback including an acceptance message with payment information or a rejection message for participation in the at least one event, similar to 306 of FIG. 3 as described above. In this case, the payment information (e.g., a payment account number, a personal identification number (PIN), an account holder's address, etc.) is included in the feedback, enabling the group reservation engine to efficiently handle payment for the reservation and split the costs between the attending group members.

If the reservation time period is not expired at 410, the process returns to 408 to continue receiving reservation feedback. As described above, the reservation time period may be a default value associated with the group reservation engine, it may be defined based on the dates associated with the reservation of the travel resources, and/or it may be defined by an organizing group member or otherwise based on group member preferences. The group reservation engine may continue to receive reservation feedback throughout the defined reservation time period, as well as transmit notifications and reminders to group members as described above.

Alternatively, if the reservation time period is expired at 410, the quantity of received acceptance messages is compared to the reservation threshold as described above. If the reservation threshold is exceeded at 412, the group reservation is finalized based on the payment information received with the acceptance messages at 414. The group members are notified of the finalized group reservation at 416. The notifications may include additional reservation information, such as which group members are attending the associated event.

Alternatively, if the reservation threshold is not exceeded at 412, the group members are notified of insufficient interest in the reservation at 418. The notification may include group member response information, such as which group members accepted and which rejected the group reservation, as well as any reasons provided for the rejection of the group reservation. The reservation of the travel resource is cancelled at 420. In some examples, the cancellation of the reservation of the travel resource may include releasing a hold on an organizing group member's payment account, refunding a deposit, fee, or portion of a payment made by the group member, or the like.

Additional Example Scenarios

Aspects of the disclosure enable various additional scenarios, such as next described.

In an example, a group of eight people want to take a trip to London. An organizing group member, Jen, establishes a date to travel and logs into a group reservation system to make travel arrangements. Jen creates a group of eight people (herself and the seven other group members) and provides e-mail addresses for each of the group members to be associated with the group reservation. Then, parameters of the group reservation are set. In this example, Jen knows that all the group members live in New York City and want to travel on the same flight. She browses available flights via the group reservation system, which is in communication with a travel aggregator for access to flight data. Jen member notices a flight that fits the travel parameters that has only ten seats available. She selects that flight as the only travel resource for reservation within the group reservation.

Jen then selects a reservation threshold of five people on the group reservation system. The group reservation is configured to only finalize reservations if five or more of the group members accept the arrangements. Based on the reservation information associated with the selected flight, Jen realized that she can only temporarily hold the eight seats on the flight for 24 hours before they are released to be available again. Jen sets the reservation time period to 23 hours, ensuring that the group reservation will be finalized or cancelled prior to the flight seats being automatically released.

Jen is prompted to provide payment information required to temporarily reserve the seats on the flight. Jen enters credit card information and an "authorization hold" is placed on her account for the total amount of all eight tickets. She is informed about the details of the hold process, because the hold with temporarily affect the amount available on her line of credit. She confirms that she accepts the authorization hold, and the eight tickets are temporarily reserved for the group reservation.

The group reservation system then sends out an e-mail notification to the group members. The e-mail notification includes a message from Jen (e.g., "Do you want to go to London? RSVP soon! I hope you can make it!", etc.), flight information and cost information of the reserved flight, and instructions for how to respond to accept or reject the group reservation. In this example, the e-mail notification includes a link that takes the group members to a web form enabling them to accept or reject the group reservation and to provide payment information and passenger identity information if they accept.

Later, most of the group member have responded with acceptance messages, but one group member has not responded. When only two hours remain in the reservation time period, the group reservation system sends another e-mail notification reminding the unresponsive member that they need to respond by the end of the reservation time period if they want to attend the trip.

When the reservation time period ends, Jen receives a notification from the group reservation system that seven of the eight group members have accepted the group reservation and provided the necessary payment and passenger information. The remaining group member had rejected the group reservation, including a message explaining that they had a scheduling conflict. Jen confirms that the flight reservation should be finalized for seven of the eight reserved seats. The costs of each seat are charged to separate group members, including Jen, based on the provided payment information. Then, the authorization hold on Jen's credit card account is released. The eighth seat that is not needed is also released and becomes available for reservation by other customers.

In an alternative example, when the reservation time period ends, Jen receives a notification from the group reservation system that only three of the eight group members have accepted the group reservation and provided the necessary payment and passenger information. The remaining group members have rejected the group reservation and provided a variety of explanations about why they cannot make the trip. Jen confirms that the group reservation should be cancelled and, as a result, the other group members receive a notification e-mail explaining that the group reservation did not receive enough interest and is cancelled. The authorization hold on Jen's account is released and the amount of credit available to Jen returns to normal. Based on agreements between the group reservation system, the travel aggregator, and the payment network, the payment network waives a "misuse fee" for playing an authorization hold without clearing.

Exemplary Operating Environment

Figure 5:
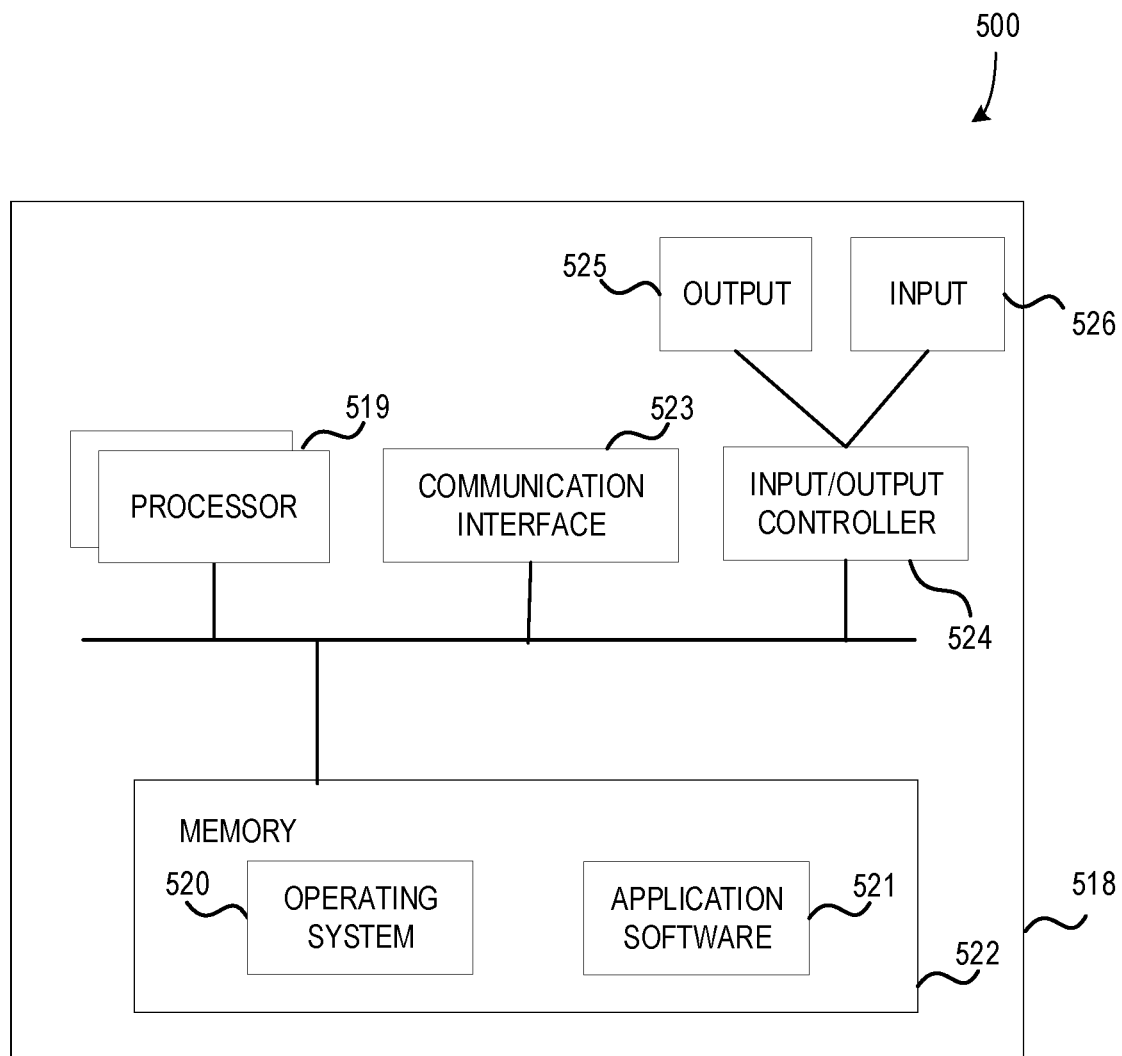
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, creating and finalizing group reservations based on member feedback as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for making group reservations of travel resources comprising:
at least one processor;
at least one network interface; and
at least one memory comprising computer program code, the at least one memory and the computer program code configured to, with the at least one processor, cause the at least one processor to:
receive a group reservation request associated with a group reservation including member data associated with group members and reservation data associated with at least one reservation relating to at least one travel resource;
transmit, via the at least one network interface, the reservation data to the group members based on the member data;
receive, via the at least one network interface, reservation feedback from at least one of the group members, the reservation feedback including an acceptance message or a rejection message for participation with the at least one travel resource;
compare a quantity of acceptance messages received in the reservation feedback to a reservation threshold;
based on the comparison, finalize the group reservation, wherein the finalized group reservation is associated with group members from whom an acceptance message was received.

the reservation data includes a reservation time period beginning when the group reservation request is received and comparing the quantity of acceptance messages to the reservation threshold occurs after the reservation time period has expired.

the at least one memory and the computer program code configured to, with the at least one processor, further cause the at least one processor to:
upon the quantity of received acceptance messages being less than the reservation threshold when the reservation time period expires, transmit, via the at least one network interface, a reservation failure notification to the group members from whom an acceptance message was received; and
cause the at least one reservation to be cancelled.

the at least one memory and the computer program code configured to, with the at least one processor, further cause the at least one processor to periodically transmit, via the at least one network interface, reservation reminder messages to group members who have yet to provide reservation feedback throughout the reservation time period.

the at least one memory and the computer program code configured to, with the at least one processor, further cause the at least one processor to transmit, via the at least one network interface, a finalized reservation notification to the group members from whom an acceptance message was received upon the group reservation being finalized.

the group reservation request is received from an organizing member of the group members and the member data associated with the organizing member includes payment account data of the organizing member; and
the at least one memory and the computer program code configured to, with the at least one processor, further cause the at least one processor to:
upon receipt of the group reservation request, cause a hold of a reservation amount associated with the at least one reservation to be placed on a payment account of the organizing member based on the payment account data; and
wherein finalizing the group reservation includes charging the group members from whom acceptance messages were received for the reservation amount and causing the hold on the payment account of the organizing member to be released.

the member data includes contact information for the group members, the contact information including at least one of a member profile identifier, a member electronic mail address, or a member phone number, wherein the reservation data is transmitted to the group members based on the contact information.

the received acceptance messages include payment information of the group members; and
wherein finalizing the group reservation includes charging a cost of the group reservation to the group members from whom an acceptance message was received based on the payment information.

the at least one travel resource includes at least one of a hotel stay, a plane flight, a sporting event, or a cultural event.

A computerized method for making group reservations of travel resources, the method comprising:
receiving, by a processor, a group reservation request associated with a group reservation including member data associated with group members and reservation data associated with at least one reservation relating to at least one travel resource;

transmitting, via a network interface, the reservation data to the group members based on the member data;

receiving, via the network interface, reservation feedback from at least one of the group members, the reservation feedback including an acceptance message or a rejection message for participation with the at least one travel resource;

comparing, by the processor, a quantity of acceptance messages received in the reservation feedback to a reservation threshold;

based on the comparison, finalizing the group reservation, wherein the finalized group reservation is associated with group members from whom an acceptance message was received.

wherein the reservation data includes a reservation time period beginning when the group reservation request is received and comparing the quantity of acceptance messages to the reservation threshold occurs after the reservation time period has expired.

further comprising, upon the quantity of received acceptance messages being less than the reservation threshold when the reservation time period expires, transmitting, via the at least one network interface, a reservation failure notification to the group members from whom an acceptance message was received; and causing the at least one reservation to be cancelled.

further comprising periodically transmitting, via the at least one network interface, reservation reminder messages to group members who have yet to provide reservation feedback throughout the reservation time period.

further comprising transmitting, via the at least one network interface, a finalized reservation notification to the group members from whom an acceptance message was received upon the group reservation being finalized.

wherein the group reservation request is received from an organizing member of the group members and the member data associated with the organizing member includes payment account data of the organizing member; and the method further comprising:

upon receipt of the group reservation request, causing a hold of a reservation amount associated with the at least one reservation to be placed on a payment account of the organizing member based on the payment account data; and wherein finalizing the group reservation includes charging the group members from whom acceptance messages were received for the reservation amount and causing the hold on the payment account of the organizing member to be released.

One or more computer storage media having computer-executable instructions for making group reservations of travel resources that, upon execution by a processor, cause the processor to at least:

receive a group reservation request associated with a group reservation including member data associated with group members and reservation data associated with at least one reservation relating to at least one travel resource;

transmit, via a network interface, the reservation data to the group members based on the member data;

receive, via the network interface, reservation feedback from at least one of the group members, the reservation feedback including an acceptance message or a rejection message for participation with the at least one travel resource;

compare a quantity of acceptance messages received in the reservation feedback to a reservation threshold;

based on the comparison, finalize the group reservation, wherein the finalized group reservation is associated with group members from whom an acceptance message was received.

wherein the reservation data includes a reservation time period beginning when the group reservation request is received and comparing the quantity of acceptance messages to the reservation threshold occurs after the reservation time period has expired.

wherein the computer-executable instructions, upon execution by a processor, further cause the processor to at least:

upon the quantity of received acceptance messages being less than the reservation threshold when the reservation time period expires, transmit, via the at least one network interface, a reservation failure notification to the group members from whom an acceptance message was received; and cause the at least one reservation to be cancelled.

wherein the computer-executable instructions, upon execution by a processor, further cause the processor to at least periodically transmit, via the network interface, reservation reminder messages to group members who have yet to provide reservation feedback throughout the reservation time period.

wherein the computer-executable instructions, upon execution by a processor, further cause the processor to at least transmit, via the network interface, a finalized reservation notification to the group members from whom an acceptance message was received upon the group reservation being finalized.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a group reservation request associated with a group reservation including member data associated with group members and reservation data associated with at least one reservation relating to at least one travel resource, means for transmitting via a network interface, the reservation data to the group members based on the member data, means for receiving via the network interface, reservation feedback from at least one of the group members, the reservation feedback including an acceptance message or a rejection message for participation with the at least one travel resource, means for comparing a quantity of acceptance messages received in the reservation feedback to a reservation threshold, and means for finalizing the group reservation based on the comparison, wherein the finalized group reservation is associated with group members from whom an acceptance message was received. The illustrated one or more processors 519 together with the computer program code stored in memory 522 constitute exemplary processing means for communicating with group members, travel aggregators, and payment networks, managing group reservations, and initiating or otherwise processing payments associated with group reservations as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for making group reservations of travel resources comprising:
   at least one processor;
   a travel aggregator interface configured to communicate with one or more computing devices associated with one or more travel aggregators via application program interfaces (APIs) exposed by the one or more travel aggregators;
   a group reservation engine configured to communicate with the one or more travel aggregators via the travel aggregator interface;
   at least one network interface; and
   at least one memory comprising computer program code, the at least one memory and the computer program code configured to, with the at least one processor, cause the at least one processor to:
      receive a group reservation request associated with a group reservation including member data associated with group members and reservation data associated with at least one reservation relating to at least one travel resource, the reservation data including historical transaction data associated with the at least one travel resource;
      transmit, via the at least one network interface, the reservation data to the group members based on the member data;
      receive, via the at least one network interface, reservation feedback from at least one of the group members, the reservation feedback including an acceptance message or a rejection message for participation with the at least one travel resource;
      compare a quantity of acceptance messages received in the reservation feedback to a reservation threshold within a reservation time period, the reservation time period being automatically determined, by the group reservation engine, based on the historical transaction data indicating a predicted low price of the at least one travel resource; and
      based on the comparison, finalize the group reservation, wherein the finalized group reservation is associated with group members from whom an acceptance message was received.

2. The system of claim 1, wherein the reservation data includes the reservation time period beginning when the group reservation request is received and comparing the quantity of acceptance messages to the reservation threshold occurs after the reservation time period has expired, wherein the reservation threshold is not exceeded unless a particular group member agrees to attend regardless of how many other group members agree to attend.

3. The system of claim 2, wherein the at least one memory and the computer program code configured to, with the at least one processor, further cause the at least one processor to:
   upon the quantity of acceptance messages being less than the reservation threshold when the reservation time period expires, transmit, via the at least one network interface, a reservation failure notification to the group members from whom an acceptance message was received; and
   cause the at least one reservation to be cancelled.

4. The system of claim 2, wherein the at least one memory and the computer program code configured to, with the at least one processor, further cause the at least one processor to periodically transmit, via the at least one network interface, reservation reminder messages to group members who have yet to provide reservation feedback throughout the reservation time period.

5. The system of claim 1, wherein the at least one memory and the computer program code configured to, with the at least one processor, further cause the at least one processor to transmit, via the at least one network interface, a finalized reservation notification to the group members from whom an acceptance message was received upon the group reservation being finalized.

6. The system of claim 1, wherein the group reservation request is received from an organizing member of the group members and the member data associated with the organizing member includes payment account data of the organizing member; and the at least one memory and the computer program code configured to, with the at least one processor, further cause the at least one processor to:

upon receipt of the group reservation request, cause a hold of a reservation amount associated with the at least one reservation to be placed on a payment account of the organizing member based on the payment account data; and wherein finalizing the group reservation includes charging the group members from whom acceptance messages were received for the reservation amount and causing the hold on the payment account of the organizing member to be released.

7. The system of claim 1, wherein the member data includes contact information for the group members, the contact information including at least one of a member profile identifier, a member electronic mail address, or a member phone number, wherein the reservation data is transmitted to the group members based on the contact information.

8. The system of claim 1, wherein the acceptance messages include payment information of the group members; and wherein finalizing the group reservation includes charging a cost of the group reservation to the group members from whom an acceptance message was received based on the payment information.

9. The system of claim 1, wherein the at least one travel resource includes at least one of a hotel stay, a plane flight, a sporting event, or a cultural event; and the at least one memory and the computer program code configured to, with the at least one processor, further cause the at least one processor to analyze the historical transaction data associated with the at least one travel resource to provide recommendations of at least one other travel resource different from the at least one travel resource.

10. A computerized method for making group reservations of travel resources, the method comprising:

receiving, by a processor, a group reservation request associated with a group reservation including member data associated with group members and reservation data associated with at least one reservation relating to at least one travel resource, the reservation data including historical transaction data associated with the at least one travel resource, the processor being programmed to execute instructions associated with a group reservation engine that is configured to communicate with one or more travel aggregators via a travel aggregator interface, the travel aggregator interface being configured to communicate with one or more computing devices associated with the one or more travel aggregators via application program interfaces (APIs) exposed by the one or more travel aggregators;

transmitting, via a network interface, the reservation data to the group members based on the member data;

receiving, via the network interface, reservation feedback from at least one of the group members, the reservation feedback including an acceptance message or a rejection message for participation with the at least one travel resource;

comparing, by the processor, a quantity of acceptance messages received in the reservation feedback to a reservation threshold within a reservation time period, the reservation time period being automatically determined, by the group reservation engine, based on the historical transaction data indicating a predicted low price of the at least one travel resource; and based on the comparison, finalizing the group reservation, wherein the finalized group reservation is associated with group members from whom an acceptance message was received.

11. The computerized method of claim 10, wherein the reservation data includes the reservation time period beginning when the group reservation request is received and comparing the quantity of acceptance messages to the reservation threshold occurs after the reservation time period has expired.

12. The computerized method of claim 11, further comprising:

upon the quantity of acceptance messages being less than the reservation threshold when the reservation time period expires, transmitting, via the network interface, a reservation failure notification to the group members from whom an acceptance message was received; and causing the at least one reservation to be cancelled.

13. The computerized method of claim 11, further comprising periodically transmitting, via the network interface, reservation reminder messages to group members who have yet to provide reservation feedback throughout the reservation time period.

14. The computerized method of claim 10, further comprising transmitting, via the network interface, a finalized reservation notification to the group members from whom an acceptance message was received upon the group reservation being finalized.

15. The computerized method of claim 10, wherein the group reservation request is received from an organizing member of the group members and the member data associated with the organizing member includes payment account data of the organizing member; and the method further comprising:

upon receipt of the group reservation request, causing a hold of a reservation amount associated with the at least one reservation to be placed on a payment account of the organizing member based on the payment account data; and wherein finalizing the group reservation includes charging the group members from whom acceptance messages were received for the reservation amount and causing the hold on the payment account of the organizing member to be released.

16. One or more computer storage media having computer-executable instructions for making group reservations of travel resources that, upon execution by a processor, cause the processor to at least:

receive a group reservation request associated with a group reservation including member data associated with group members and reservation data associated with at least one reservation relating to at least one travel resource, the reservation data including historical transaction data associated with the at least one travel resource, the processor being programmed to execute instructions associated with a group reservation engine that is configured to communicate with one or more travel aggregators via a travel aggregator interface, the travel aggregator interface being configured to communicate with one or more computing devices associated with the one or more travel aggregators via application program interfaces (APIs) exposed by the one or more travel aggregators;

transmit, via a network interface, the reservation data to the group members based on the member data;

receive, via the network interface, reservation feedback from at least one of the group members, the reservation feedback including an acceptance message or a rejection message for participation with the at least one travel resource;

compare a quantity of acceptance messages received in the reservation feedback to a reservation threshold within a reservation time period, the reservation time period being automatically determined, by the group reservation engine, based on the historical transaction data indicating a predicted low price of the at least one travel resource; and based on the comparison, finalize the group reservation, wherein the finalized group reservation is associated with group members from whom an acceptance message was received.

17. The one or more computer storage media of claim 16, wherein the reservation data includes the reservation time period beginning when the group reservation request is received and comparing the quantity of acceptance messages to the reservation threshold occurs after the reservation time period has expired.

18. The one or more computer storage media of claim 17, wherein the computer-executable instructions, upon execution by a processor, further cause the processor to at least:
    upon the quantity of acceptance messages being less than the reservation threshold when the reservation time period expires, transmit, via the network interface, a reservation failure notification to the group members from whom an acceptance message was received; and
    cause the at least one reservation to be cancelled.

19. The one or more computer storage media of claim 17, wherein the computer-executable instructions, upon execution by a processor, further cause the processor to at least periodically transmit, via the network interface, reservation reminder messages to group members who have yet to provide reservation feedback throughout the reservation time period.

20. The one or more computer storage media of claim 16, wherein the computer-executable instructions, upon execution by a processor, further cause the processor to at least transmit, via the network interface, a finalized reservation notification to the group members from whom an acceptance message was received upon the group reservation being finalized.

* * * * *